US006937419B2

(12) United States Patent
Suk et al.

(10) Patent No.: US 6,937,419 B2
(45) Date of Patent: Aug. 30, 2005

(54) METHOD AND APPARATUS FOR RECOVERING LOAD/UNLOAD ZONE REAL ESTATE ON DATA STORAGE MEDIA IN DATA STORAGE DEVICES TO INCREASE A DATA STORAGE CAPACITY THEREOF

(75) Inventors: Mike Suk, San Jose, CA (US); Donald R. Gillis, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 218 days.

(21) Appl. No.: 10/385,097

(22) Filed: Mar. 10, 2003

(65) Prior Publication Data

US 2004/0179289 A1 Sep. 16, 2004

(51) Int. Cl.$^7$ ............................................. G11B 21/02
(52) U.S. Cl. ............................................................ 360/75
(58) Field of Search ............................ 360/75, 73.03, 360/236.6, 236.2, 103

(56) References Cited

U.S. PATENT DOCUMENTS

| | | | |
|---|---|---|---|
| 5,379,166 A | | 1/1995 | Tsukada et al. |
| 5,796,543 A | * | 8/1998 | Ton-That ................. 360/77.08 |
| 5,796,551 A | | 8/1998 | Samuelson |
| 5,872,686 A | | 2/1999 | Dorius et al. |
| 5,941,998 A | * | 8/1999 | Tillson ........................ 714/54 |
| 5,959,806 A | | 9/1999 | Leung |
| 5,986,451 A | * | 11/1999 | Kagan ........................ 324/210 |
| 6,002,552 A | | 12/1999 | Leung |
| 6,069,769 A | | 5/2000 | Dorius et al. |
| 6,441,999 B1 | * | 8/2002 | Tang et al. ............... 360/236.6 |
| 6,501,621 B1 | * | 12/2002 | Griffin et al. ............ 360/235.6 |
| 6,747,824 B1 | * | 6/2004 | Smith ........................... 360/31 |
| 2001/0022701 A1 | * | 9/2001 | Ishii et al. ............... 360/73.03 |
| 2002/0089787 A1 | * | 7/2002 | Lu et al. .................. 360/235.1 |
| 2003/0188420 A1 | * | 10/2003 | Wong et al. ............. 29/603.04 |
| 2004/0213922 A1 | * | 10/2004 | Abrams et al. ............. 427/596 |

FOREIGN PATENT DOCUMENTS

JP      3058346 A      3/1991

OTHER PUBLICATIONS

Suk, M. and Gillis, D., "Effect of Sllider on Disk Damage During Dynamic Load/Unload", Contributed by the Tribology Division of the American Society of Mechanical Engineers, vol. 120, Apr. 1998, pp. 332–338.

Suk, M., Dennig, P. and Gillis, D., "Magnetic Erasures Due to Impact Induced Interfacial Heating and Magnetostriction", Contributed by the Tribology Division of the American Society of Mechanical Engineers, vol. 122, Apr. 2000, pp. 264–268.

Suk, M., Ruiz, O., Gillis, D. and Wolter, R., "Minimizing Disk Damage During Dynamic Load/Unload Using Self- -Adjusting Negative-Pressure Air-Bearing", Proceedings of the International Tribology Conference, Nagasaki, 2000, pp. 2169–2174.

* cited by examiner

Primary Examiner—David Hudspeth
Assistant Examiner—Mitchell R Slavitt
(74) Attorney, Agent, or Firm—Bracewell & Giuliani LLP

(57) ABSTRACT

A hard disk drive utilizes hard disks that recover the historically unused read/write space or real estate located in the load/unload zone. Approximately one-half of the load/unload zone is recovered and available for reading and writing operations by forming a first or radially outermost read/write track beginning immediately adjacent to the inner radial edge of the load/unload zone and proceeding radially inward from there to the conventional location of first tracks in the prior art. In another version of the invention, almost the entire load/unload zone is recovered and available for reading and writing operations by aligning the first track with the center of the load/unload zone and proceeding radially inward from there as described above. Both of these versions make significant additional surface area on the disk available where, in the prior art, no data was stored, thereby increasing the efficiency and storage capacity of the hard disk drive.

22 Claims, 3 Drawing Sheets

METHOD AND APPARATUS FOR RECOVERING LOAD/UNLOAD ZONE REAL ESTATE ON DATA STORAGE MEDIA IN DATA STORAGE DEVICES TO INCREASE A DATA STORAGE CAPACITY THEREOF

BACKGROUND OF THE INVENTION

1. Technical Field

The present invention relates in general to improved utilization of disk storage space in a hard disk drive and, in particular, to an improved method and apparatus for recovering previously unutilized load/unload zone real estate on the disks of hard disk drives.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

In hard disk drives, load/unload (L/UL) designs are used to "load" the slider down from a ramp onto the spinning disk prior to any data reading and writing operations, and "unloaded" off of the disk back onto the ramp when the reading and writing operations are complete. As shown in FIG. 1, the area of contact on the disk surface is typically located adjacent to the outer radial edge 11 of the disk 13 and is known as the "load/unload zone" 15. Since the contact of the slider 17 with the disk can damage the disk, the load/unload zone 15 is not used to store data or for reading and writing operations. Load/unload zone 15 extends inward for a prescribed radial distance Z to an inner radial position 19. The first (radially outermost) read/write track 21 is located radially inward of inner radial position 19. Additional read/write tracks 25 are located radially inward of first track 21. Load/unload designs reduce the problems of head-disk stiction and media damage from shock as the fly height (e.g., the height at which a slider flies above the surface of a spinning disk) continues to decrease. These designs also have the advantage of reducing power consumption.

However, as stated previously, L/UL schemes potentially risk media damage from slider-disk contact during loading and/or unloading due to high disk speeds and high load/unload speeds. Research has shown that this damage is specifically associated with the sharp corners and/or edges of the block-like sliders digging into the disk surface upon impact. The resulting damage in the L/UL zone of the disk makes this region unsuitable for data storage, thereby reducing the overall storage capacity of the drive by 5 to 15%. Thus, an improved method and system for overcoming these problems to better utilize the L/UL zone is needed.

SUMMARY OF THE INVENTION

One embodiment of a hard disk drive apparatus and method constructed in accordance with the present invention utilizes hard disks that recover the historically unused read/write space or real estate located in the load/unload zone. Approximately one-half of the load/unload zone is recovered and available for reading and writing operations by forming a first (radially outermost) read/write track beginning immediately adjacent to the inner radial edge of the load/unload zone and proceeding radially inward from there to the "conventional" location of first tracks in the prior art. In an alternate embodiment of the present invention, almost the entire load/unload zone is recovered and available for reading and writing operations by aligning the first track with the center of the load/unload (L/UL) zone and proceeding radially inward from there as described above. Both of these embodiments make significant additional surface area on the disk available where, in the prior art, no data was stored, thereby increasing the efficiency and storage capacity of the hard disk drive.

The problem of disk damage during L/UL is reduced by designing the air bearing, suspension, ramp, and disk drive parameters (e.g., disk and L/UL speeds) such that head-disk contact is eliminated or reduced. Alternatively, the slider itself can be processed in such a way that any contact that does occur causes no damage or an acceptably small amount of damage to the disk. Rounding, which also is referred to as "blending," slider corners and/or edges so that no sharp points (regions of high stress concentration) are presented to the disk surface during contact, is a demonstrated way to reduce disk damage from L/UL. Slider corner and/or edge rounding may have the added benefit of reducing disk damage associated with mechanisms other than L/UL, such as reading or writing in the presence of operational shock, disk defects, or particles. By reducing the severity of slider-disk impacts, corner and edge rounding can additionally reduce particle generation in the drive, and thereby improve drive reliability. Yet another benefit results from rounding, smoothing, or chamfering the rough, saw-cut edge of the slider and removing any poorly-attached particles that would otherwise be released into the drive upon contact.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF A PREFERRED EMBODIMENT

Figure 2:
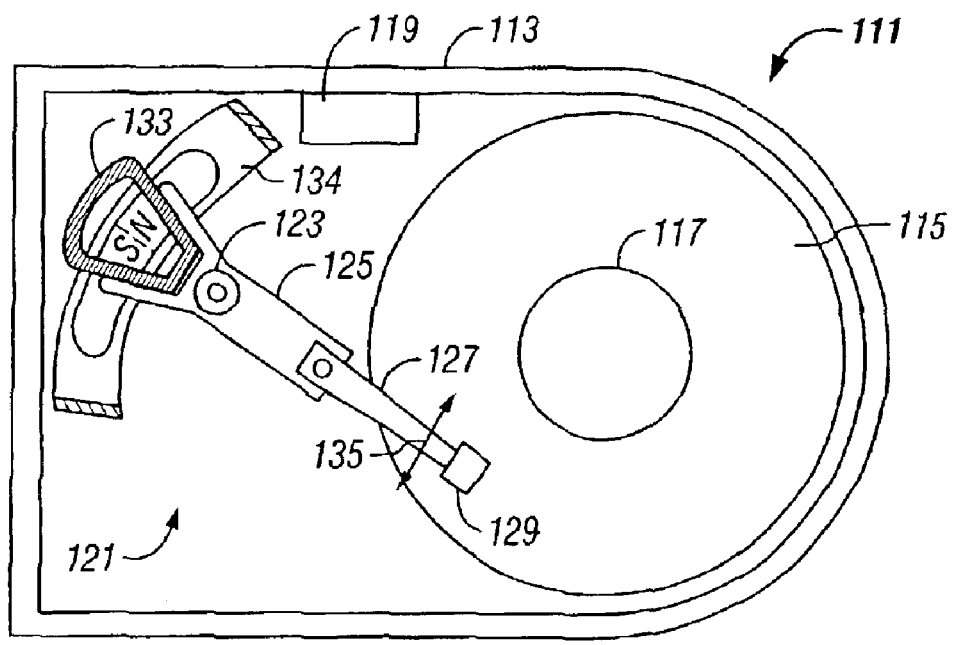
FIG. 2 is a schematic plan view of one embodiment of a hard disk drive constructed in accordance with the present invention.

Referring to FIG. 2, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beam or suspension 127. A magnetic read/write transducer or head is mounted on a slider 129 (shown schematically) and secured to a flexure that is flexibly mounted to each suspension 127. The read/write heads magnetically read data from and/or magnetically write data to a data storage area of the disks 115. The level of integration called the head gimbal assembly is the head and the slider 129, which are mounted on suspension 127. The slider 129 is usually bonded to the end of suspension 127. The head is typically pico size (approximately 1250× 1000×300 microns) and formed from ceramic or intermetallic materials. The head also may be femto size (approximately 850×700×230 microns) and is pre-loaded against the surface of disk 115 (in the range two to ten grams) by suspension 127.

Suspensions 127 have a spring-like quality which biases or urges the slider air bearing surface against the disk to enable the creation of the air bearing film between the slider and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves head gimbal assemblies radially across the data storage tracks on the disks 115 until the heads settle on the target tracks. The head gimbal assemblies operate in a conventional manner and always move in unison with one another, unless drive 111 uses multiple independent actuators (not shown) wherein the arms can move independently of one another.

Figure 3:
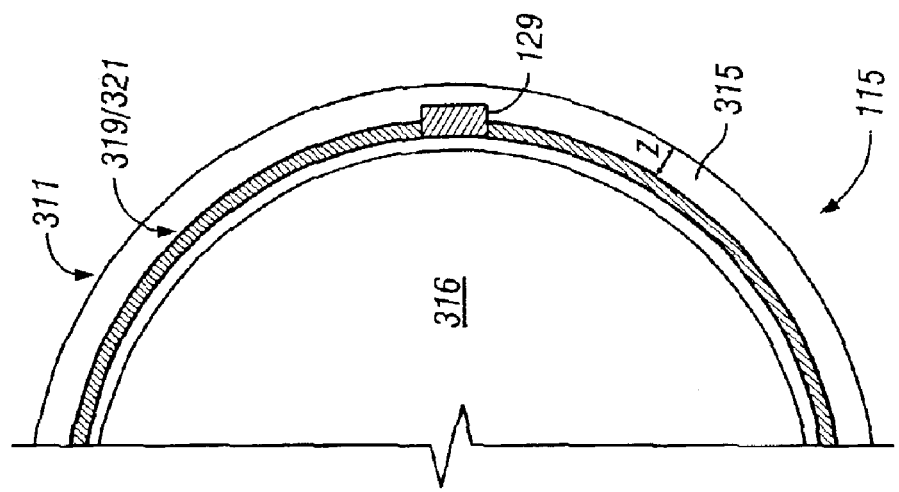
FIG. 3 is an enlarged schematic plan view of a portion of a first embodiment of the hard disk drive of FIG. 2 and is constructed in accordance with the present invention.
Figure 1:
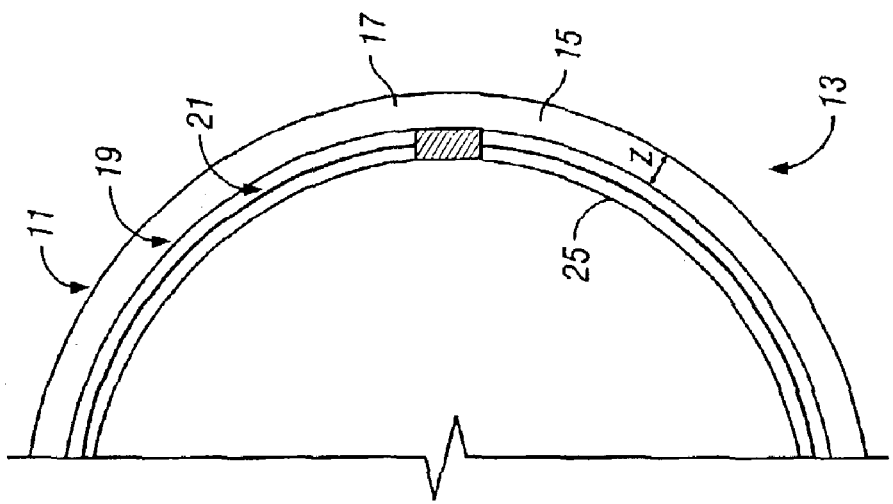
FIG. 1 is a schematic plan view of a portion of a conventional disk used in a prior art disk drive.

Drive 111 employs a load/unload (L/UL) design in which the slider 129 is loaded down from a ramp (not shown) onto the spinning disk 115 prior to any data reading and writing operations, and unloaded off of the disk back onto the ramp when the reading and writing operations are complete. As shown schematically in FIG. 3, the area of contact on the surface of disk 115 is typically located adjacent to the outer radial edge 311 of the disk 115 and is known as the "load/unload zone" 315. The load/unload zone 315 extends radially inward for a prescribed radial distance Z to an inner radial position 319. However, the load/unload zone 315 also may be located at a radially inward position (not shown) adjacent to the hub 117 (FIG. 2) of the disk 115 rather than the outer radial perimeter or boundary of the disk 115. Since the contact of prior art sliders with conventional disks can damage the disks, historically the load/unload zone is not used to store data or for reading and writing operations. However, with the method and apparatus of the present invention, the load/unload zone 315 is available for such operations.

In one embodiment of the present invention (FIG. 3), the first read/write track 321 is located in the load/unload zone 315 at an interface between the load/unload zone 315 and a remainder 316 of the data storage area, or slightly radially inward from the interface. The interface is defined as the area of disk 115 that is located at the intersection between the load/unload zone 315 and the remainder 316 of the data storage area. Thus, with respect to the first read/write track 321, the slider 129 "straddles" the interface such that an inner radial portion of slider 129 is located over the remainder 316, and an outer radial portion of slider 129 is located over load/unload zone 315, as shown, as data is read from or written to track 321. Other read/write tracks are located radially inward of the first read/write track 321.

Figure 4:
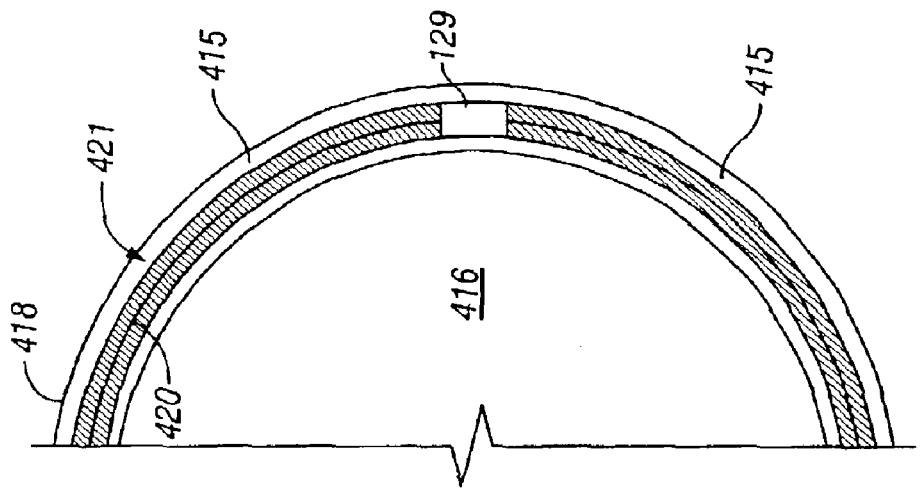
FIG. 4 is a schematic plan view of a portion of a second embodiment of the hard disk drive of FIG. 2 and is constructed in accordance with the present invention.

In another embodiment of the present invention (FIG. 4), the first read/write track 421 is located in the load/unload zone 415 adjacent to a boundary 418 of the load/unload zone 415 that is radially spaced apart from a remainder 416 of the data storage area. In the version shown, this is approximately at the radial center of the load/unload zone 415, or slightly radially inward of the radial center. The radial center is defined as that portion of disk 115 that is located about half way between the inner and outer radial boundaries 420, 418 of load/unload zone 415. Thus, with respect to track 421, the slider 129 is located entirely or almost entirely over the load/unload zone 415, as shown, as data is read from or written to track 421. Other read/write tracks are located radially inward of the first read/write track 421, some of which are also located in the load/unload zone 415.

Figure 5:
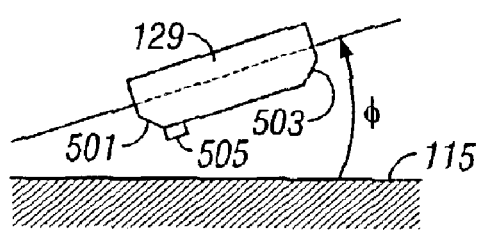
FIG. 5 is a schematic side view diagram of a slider and disk used in the hard disk drive of FIG. 2.

A number of component level and file level control parameters are used to facilitate accomplishment of the present invention in recovering at least a portion of the load/unload zone for data read/write operations. For example, at the component level, the slider may be oriented relative to the disk so as to have a positive pitch static attitude (PSA). As shown schematically in FIG. 5, a positive pitch static attitude is defined by a trailing edge 501 of the slider 129 being closer to the data storage medium 115 than a leading edge 503 of the slider 129 when the slider is not in a "flying" state. In this configuration, the trailing edge 501 is inclined at an angle φ to approach the data storage medium 115 before the leading edge 503, and thereby reduce the probability of contact between the leading edge 503 and the data storage medium 115. Orienting the slider 129 at a positive PSA reduces the risk of damaging the data storage medium 115 while allowing data operations in the load/unload zone.

Another component level parameter that enhances the success of reading and writing data in the load/unload zone is providing at least one landing pad 505 (FIG. 5) on the slider 129 adjacent to or at the trailing edge 501. With the landing pad 505 in this position, the landing pad 505 reduces the probability of direct contact between the slider 129 and data storage medium 115. If contacts do occur, the landing pad 505 tends to make contact the data storage medium 115 rather than the slider 129 itself and thereby reduce the probability of damage to the data storage medium 115. The details of implementing this parameter are disclosed in U.S. Pat. No. 5,796,551 to Samuelson, which is incorporated herein by reference.

One of the file level variables of the present invention includes controlling the load velocity of the slider 129. The load velocity is defined by a rate at which the slider 129 moves toward the data storage medium 115. In one implementation, the load velocity is reduced from typical prior art load velocities to approximately 15 mm/second to reduce damage to the data storage medium 115 and thermal erasure of data recorded on the data storage medium 115 due to an impact between the slider 129 and the data storage medium 115. Additional details regarding thermal erasure are discussed in the paper, *Magnetic Erasures Due to Impact Induced Interfacial Heating and Magnetostriction*, by M. Suk, et al, Transactions of the ASME, Vol. 122, January 2000, which is incorporated herein by reference.

Another file level parameter that reduces the risk of damage to the data storage medium 115 while performing data operations in the load/unload zone is a manufacturing bum-in cycle. With this parameter, load/unload cycles are performed with the slider 129 on the data storage medium 115 during manufacturing of the data storage device 111 prior to any servo writing operations in the data storage area. These cycles remove abnormalities present in the data storage area and on the slider 129 such that, if damage to the data storage area occurs during this phase of manufacturing, then a damaged portion of the data storage area is mapped out so that no data is written in the damaged portion.

Figure 6:
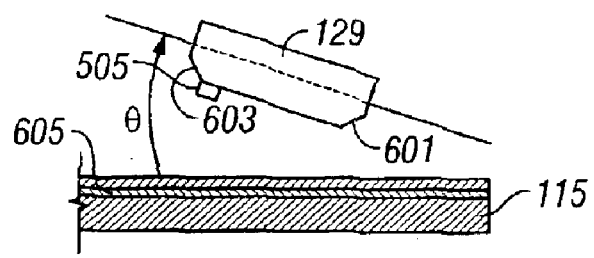
FIG. 6 is a schematic end view diagram of a slider and disk used in the hard disk drive of FIG. 2.

The present invention also utilizes a number of optional parameters which can significantly affect the performance of read/write operations in the load/unload zone. For example, at the component level, the slider 129 can be oriented relative to the data storage medium 115 so that the slider 129 has a biased roll static attitude. As shown in FIG. 6, the biased roll static attitude is defined by an outer radial edge 601 of the slider 129 being closer to the data storage medium 115 than an inner radial edge 603 of the slider 129. In this way, if contacts do occur, the outer radial edge 601 is inclined at an angle θ to contact the data storage medium 115 before the inner radial edge 603, and thereby reduce contact between the inner radial edge 603 and the data storage medium 115. This forces all of the potential damage to occur at the outer radial periphery of the load/unload zone aligned with the outer radial edge 601 of the slider 129. Thus, the probability of data damage due to mechanical damage to the data storage medium 115 or thermal erasure within the region radially inward from the outer edge of the load/unload zone is significantly reduced.

Figure 7:
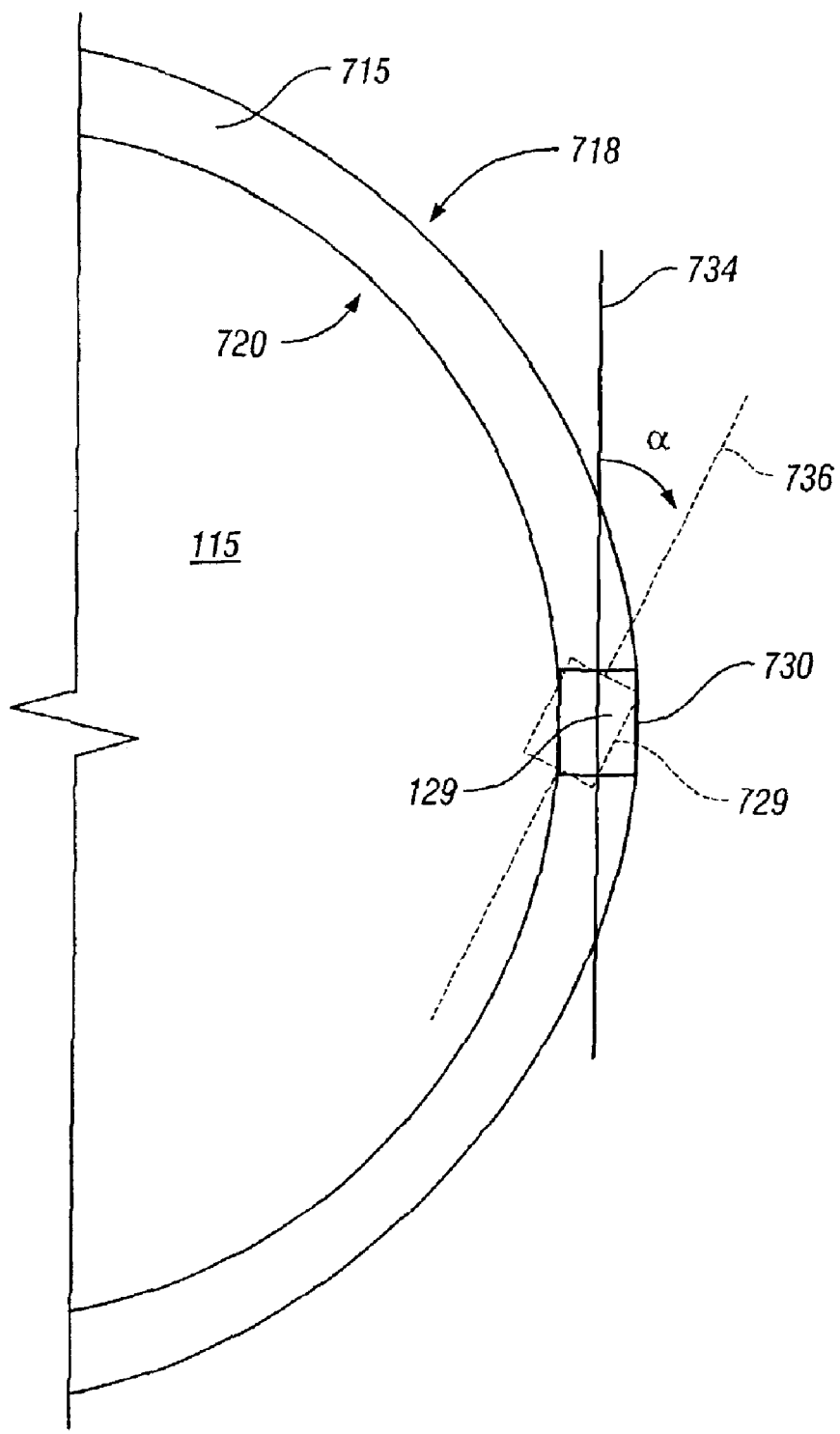
FIG. 7 is a schematic plan view of a portion of another configuration used by the hard disk drive of FIG. 2 and is constructed in accordance with the present invention.

In addition, a slider 729 (dashed lines) may be oriented at a skew angle a (FIG. 7) that is non-zero. The skew angle a is defined as the angle between a centerline 736 of the slider 729 and a centerline 734 of the slider 129 that is perpendicular to radii of the data storage media 115. In FIG. 7, the leading outer radial corner 730 of slider 729 is radially aligned with the outer edge 718 of the load/unload zone 715. Skewing the slider 729 increases the size of the load/unload zone because of the increased radial profile of the slider 729 relative to the media 115. Thus, the size of the load/unload zone is reduced and the data storage area is effectively increased by designing a system with approximately zero skew at the load/unload zone, as shown by slider 129 in FIG. 7.

Several other optional but significant parameters at the file level of control include reducing a rotational speed of the data storage medium 115 from rotational speeds typically used in the prior art when the slider 129 is loaded and unloaded with respect to the data storage medium 115. Like the previous parameters, this process reduces damage to the data storage medium 115 and thermal erasure of data recorded in the data storage area. Another variable is to write-verify data when the data that is written in the load/unload zone to confirm that the data written in the load/unload zone was written correctly. If the data is written incorrectly and the same area continues to fail record, then the same area can be mapped out so that data is not written to the same area in the future.

Yet another parameter is to provide error-correction-code (ECC) bytes in the load/unload zone that are longer than conventional ECC bytes that one skilled in the art would provide in the remainder of the data storage area. The load/unload zone typically has no ECC bytes since data is not normally written there. However, with the present invention, ECC bytes are used in the load/unload zone and they are longer than normal so that if any data is lost, more of the lost data can be recovered. This enhancement improves recovery of any data that is lost after being recorded in the load/unload zone. Furthermore, if data is recovered with ECC bytes, the system can be designed to map out the same region so that the data is moved to another location and data is no longer recorded in the same area in the future.

The present invention also includes a number of optional parameters that are more difficult to implement, but can have a dramatic affect on the performance of the data storage device when data is read from or written to the load/unload zone. These parameters include rounding the corners of the slider 129 (see FIGS. 5 and 6). Rounding the corners of the slider located at intersections between the leading and trailing edges 503, 501, and the inner and outer radial edges 603, 601, decreases contact stress between the slider 129 and the data storage medium 115. Details regarding this parameter are disclosed in U.S. Pat. Nos. 6,069,769, and 5,872,686, both to Dorius, et al, which are incorporated herein by reference.

Another parameter includes providing the data storage area with a thermally conductive underlayer 605 (FIG. 6), silicon substrate, or like substrates with similar thermal diffusivity to reduce thermal erasure of data recorded in the data storage area when contact between the slider 129 and the data storage medium 115 occurs. The thermally conductive disk underlayer 605 reduces the potential for thermal erasure. In contrast, conventional glass substrates have low thermal conductivity, which results in localized heating when the slider contacts the disk. Substrates or thick underlayers 605 that are thermally conductive remove heat away from the point of contact quickly, thus the temperature at the contact point cannot rise high enough for thermal induced erasure of data. See the "Transactions of the ASME" paper, described above. Similarly, the slider material can be made of softer material, more thermally conductive material like silicon, and materials that would lead to a generally smoother finish in order to reduce the likelihood of damage and thermal erasure. Yet another parameter comprises specifying that the load/unload zone of the data storage area is a last area written to by the head, or remapping the logical block address (LBA), which would further reduce errors in the load/unload zone.

Finally, a parity sector may be implemented in the data storage area to improve recovery of any data that is lost after being recorded in the load/unload zone. See, e.g., U.S. Pat. No. 5,745,453, to Ikeda, which is incorporated herein by reference. In loading and unloading on data, an error mechanism is introduced that is independent of the writing and reading of data. This means there is no correlation between when the sector was last accessed and when an error may be induced. In such a situation, on track parity by itself is not reliable. With on track parity (or any other type of error correction), the system has a maximum capacity to correct m errors. That means that the error must be detected prior to exceeding m errors on the track. It is possible that there are >m errors on a track due to multiple independent error events (different l/ul incidents) and the data is not recoverable. This can occur since there is no correlation between l/ul and reading data in the affected area since there could be years between reads. Thus, it is insufficient to just have parity on the track.

As an example, a parity system can be instituted where there is 1 parity sector per 4 data sectors (with or without interleaving). If any given "event" hits only one sector of this parity set (due to clever interleaving, or small defect size), there is a finite probability that another such event will hit this track again (it is known to happen on this track). This hit could also be in this parity set. Interleaving does not change this, since 5 sectors is a constant percentage of a track no matter how arranged.

A solution to this problem is to create the parity sets including data from out of harms way. Each parity set is limited to one sector in the l/ul zone, thus any number of errors in the l/ul zone will always be corrected (other error mechanisms aside). This is more of a "radial" parity arrangement, where the parity set comprises at least 2 tracks. In situations where the error mechanism is not coupled to the access mechanism, data scrubbing is required. Data scrubbing involves the reading and testing of the parity sets to ensure validity (a standard solution in RAID, memory systems, etc.). The concept is to force a correlation between error incidents and accesses. In this case, the parity sets must be checked before the number of errors on a track is likely to exceed m. Any errors found during scrubbing are corrected from the parity. The downside to data scrubbing is the performance hit: there is still a problem with multiple-revolutions for writes, plus down time to do the scrubbing. The trick with data scrubbing is when and how often to do it. In RAID systems, it is done in the background during idle times. In RAID the purpose of scrubbing is to guarantee fault tolerance. If a parity set has an error, it can still be recovered. However, the data may not be recovered if one of the drive fails. Therefore, without data scrubbing, the array is not fault tolerant.

In the present case, the frequency and timing of scrubbing depend on the application and the error generation details. Unfortunately, there may not be any "idle" time in a non-traditional application. For example, when a picture is taken with a digital camera, the drive is spun up, the data written and then the power is shut off. This leaves no opportunity for background scrubbing. The only way to be sure that it takes place is to force it to occur either before accepting data from the camera, or before posting "write complete." Either way, the delay time is required for performing the scrub. In a music device (e.g., MP3), the situation is similar. Unless the drive is performing the power management and buffering, the host will just spin up, read what is needed, and shut off the drive.

The amount of performance that is lost due to scrubbing depends on how much scrubbing is needed per incident. If any l/ul event can cause errors, then a scrub is needed after every load. The number of tracks that need scrubbing depends on determination of the landing location. The entire zone may need to be scrubbed. A "best case" (no errors found) scrub requires [period*number_tracks*number_heads]. The number of tracks appears to be a significant fraction of the drive (>1%), otherwise it would not be worthwhile to put data in the zone. For example, if there are 100 tracks*2 heads at 3600 rpm, 3.2 seconds are required to perform the scrub. Although this solution solves the data integrity issue if the scrubbing frequency is high, the performance cost is very high.

The present invention has several advantages. A hard disk drive apparatus and method constructed in accordance with the present invention utilizes hard disks that recover the historically unused read/write space or real estate located in the load/unload zone. Approximately one-half of the load/unload zone is recovered and available for reading and writing operations by forming a first read/write track beginning immediately adjacent to the inner radial edge of the load/unload zone and proceeding radially inward from there to the "conventional" location of first tracks in the prior art. Alternatively, almost the entire load/unload zone is recovered and available for reading and writing operations by aligning the first track with the center of the load/unload (L/UL) zone and proceeding radially inward from there as described above. These embodiments make significant additional surface area on the disk available where, in the prior art, no data was stored, thereby increasing the efficiency and storage capacity of the hard disk drive.

The problem of disk damage during loading and unloading operations is reduced by designing the air bearing, suspension, ramp, and disk drive parameters, such that head-disk contact is eliminated or reduced. Alternatively, the slider itself can be processed in such a way that any contact that does occur causes no damage or an acceptably small amount of damage to the disk. Rounding, which also is referred to as "blending," slider corners and/or edges so that no sharp edges are presented to the disk surface during contact, is a demonstrated way to reduce disk damage from L/UL. Slider corner and/or edge rounding may have the added benefit of reducing disk damage associated with mechanisms other than L/UL, such as reading or writing in the presence of operational shock, disk defects, or particles. By reducing the severity of slider-disk impacts, corner and edge rounding can additionally reduce particle generation in the drive, and thereby improve drive reliability. Yet another benefit results from rounding, smoothing, or chamfering the rough, saw-cut edge of the slider and removing any poorly-attached particles that would otherwise be released into the drive upon contact.

While the invention has been shown or described in only some of its forms, it should be apparent to those skilled in the art that it is not so limited, but is susceptible to various changes without departing from the scope of the invention.

What is claimed is:

1. A method of increasing a data storage capacity of a data storage medium, comprising:
providing a data storage device with a rotatable data storage medium having a recordable data storage area and a load/unload zone that comprises a portion of the data storage area, and a slider having a head for reading data from and writing data to the data storage area;
orienting the slider relative to the data storage medium so that the slider has a positive pitch static attitude defined by a trailing edge of the slider being closer to the data storage medium than a leading edge of the slider, such that the trailing edge approaches the data storage medium before the leading edge, and thereby reduces contact between the leading edge and the data storage medium;
providing a landing pad on the slider adjacent to the trailing edge for reducing direct contact between the slider and the data storage medium;
reducing a load velocity of the slider to reduce damage to the data storage medium and thermal erasure of data recorded on the data storage medium due to an impact between the slider and the data storage medium, the load velocity being defined by a rate at which the slider moves toward the data storage medium;
performing load/unload cycles with the slider on the data storage medium during manufacturing of the data storage device prior to any servo writing operations in the data storage area to remove abnormalities present in the data storage area such that, if damage to the data storage area occurs during this phase of manufacturing, then a damaged portion of the data storage area is mapped out so that no data is written in the damaged portion; and
writing data to and reading data from the load/unload zone of the data storage area.

2. The method of claim 1, further comprising orienting the slider relative to the data storage medium so that the slider has a biased roll static attitude defined by a outer radial edge of the slider being closer to the data storage medium than a inner radial edge of the slider, such that the outer radial edge approaches the data storage medium before the inner radial edge, and thereby reduces contact between the inner radial edge and the data storage medium.

3. The method of claim 1, further comprising reducing a rotational speed of the data storage medium when the slider is loaded and unloaded with respect to the data storage medium to reduce damage to the data storage medium and thermal erasure of data recorded in the data storage area.

4. The method of claim 1, further comprising write-verifying data when data is written in the load/unload zone to confirm that the data written in the load/unload zone was written correctly.

5. The method of claim 1, further comprising providing error-correction-code bytes in the load/unload zone and increasing a length of the error-correction-code bytes to improve recovery of any data that is lost after being recorded in the load/unload zone.

6. The method of claim 1, further comprising rounding corners of the slider, the corners being located at intersections between the leading and trailing edges and the inner and outer radial edges to decrease contact stress between the slider and the data storage medium.

7. The method of claim 1, further comprising providing the data storage area with a thermally conductive underlayer to reduce thermal erasure of data recorded in the data storage area when contact between the slider and the data storage medium occurs.

8. A method of increasing a data storage capacity of a data storage medium, comprising:
providing a data storage device with a rotatable data storage medium having a recordable data storage area and a load/unload zone that comprises a portion of the data storage area, and a slider having a head for reading data from and writing data to the data storage area;
orienting the slider relative to the data storage medium so that the slider has a positive pitch static attitude defined by a trailing edge of the slider being close to the data storage medium than a leading edge of the slider, such that the trailing edge approaches the data storage medium before the leading edge, and thereby reduces contact between the leading edge and the data storage medium;
providing a landing pad on the slider adjacent to the trailing edge for reducing direct contact between the slider and the data storage medium;
reducing a load velocity of the slider to reduce damage to the data storage medium and thermal erasure of data recorded on the data storage medium due to an impact between the slider and the data storage medium, the load velocity being defined by a rate at which the slider moves toward the data storage medium;
performing load/unload cycles with the slider on the data storage medium during manufacturing of the data storage device prior to any servo writing operations in the data storage area to remove abnormalities present in the data storage area such that, if damage to the data storage area occurs during this phase of manufacturing, then a damaged portion of the data storage area is mapped out so that no data is written in the damaged portion;
writing data to and reading data from the load/unload zone of the data storage area; and
specifying that the load/unload zone of the data storage area is a last area written to by the head.

9. The method of claim 1, further comprising implementing a parity sector in the data storage area to improve recovery of any data that is lost after being recorded in the load/unload zone.

10. The method of claim 1, further comprising writing a first track in the load/unload zone at an interface between the load/unload zone and a remainder of the data storage area.

11. The method of claim 1, further comprising writing a first track in the load/unload zone adjacent to a boundary of the load/unload zone that is spaced apart from a remainder of the data storage area.

12. The method of claim 1, further comprising orienting the slider relative to the data storage medium so that the slider has an approximately zero skew angle defined by an angle between a centerline of the slider and a tangent that is perpendicular to a radius of the data storage medium, such that a size of the load/unload zone required by the data storage device is reduced.

13. A method of increasing a data storage capacity of a disk, comprising:

providing a hard disk drive with a rotatable disk having a recordable data storage area and a load/unload zone that comprises a portion of the data storage area, and a slider having a head for reading data from and writing data to the data storage area;

orienting the slider relative to the disk so that the slider has a positive pitch static attitude defined by a trailing edge of the slider being closer to the disk than a leading edge of the slider, such that the trailing edge approaches the disk before the leading edge, and thereby reduces a probability of contact between the leading edge and the disk;

providing a landing pad on the slider adjacent to the trailing edge for reducing a probability of direct contact between the slider and the disk;

reducing a load velocity of the slider to reduce a probability of damage to the disk and thermal erasure of data recorded on the disk due to an impact between the slider and the disk, the load velocity being defined by a rate at which the slider moves toward the disk;

performing load/unload cycles with the slider on the disk during manufacturing of the hard disk drive prior to any servo writing operations in the data storage area to remove abnormalities present in the data storage area such that, if damage to the data storage area occurs during this phase of manufacturing, then a damaged portion of the data storage area is mapped out so that no data is written in the damaged portion;

orienting the slider relative to the disk so that the slider has a biased roll static attitude defined by a outer radial edge of the slider being closer to the disk than a inner radial edge of the slider, such that the outer radial edge approaches the disk before the inner radial edge, and thereby reduces contact between the Inner radial edge and the disk;

reducing a rotational speed of the disk when the slider is loaded and unloaded with respect to the disk to reduce damage to the disk and thermal erasure of data recorded in the data storage area;

write-verifying data when data is written in the load/unload zone to confirm that the data written in the load/unload zone was written correctly;

providing error-correction-code bytes in the load/unload zone and increasing a length of the error-correction-code bytes to improve recovery of any data that is lost after being recorded in the load/unload zone; and writing data to and reading data from the load/unload zone of the data storage area.

14. The method of claim 13, further comprising rounding corners of the slider, the corners being located at intersections between the leading and trailing edges and the inner and outer radial edges to decrease a probability of contact stress between the slider and the disk.

15. The method of claim 13, further comprising providing the data storage area with a thermally conductive underlayer to reduce a probability of thermal erasure of data recorded in the data storage area when contact between the slider and the disk occurs.

16. The method of claim 13, further comprising specifying that the load/unload zone of the data storage area is a last area written to by the head.

17. The method of claim 13, further comprising implementing a parity sector in the data storage area to improve a probability of recovery of any data that is lost after being recorded in the load/unload zone.

18. The method of claim 13, further comprising writing a first track in the load/unload zone adjacent to at an interface between the load/unload zone and a remainder of the data storage area.

19. The method of claim 13, farther comprising writing a first track in the load/unload zone adjacent to a radial centerline of the load/unload zone.

20. The method of claim 13, further comprising orienting the slider relative to the disk so that the slider has an approximately zero skew angle defined by an angle between a centerline of the slider and a tangent that is perpendicular to a radius of the disk, such that a size of the load/unload zone required by the hard disk drive is reduced.

21. The method of claim 7, wherein the thermally conductive underlayer is a silicon substrate.

22. The method of claim 15, wherein the thermally conductive underlayer is a silicon substrate.

* * * * *